(12) United States Patent
Thunuguntla et al.

(10) Patent No.: US 11,630,829 B1
(45) Date of Patent: Apr. 18, 2023

(54) AUGMENTING SEARCH RESULTS BASED ON RELEVANCY AND UTILITY

(71) Applicant: Intuit Inc., Mountain View, CA (US)

(72) Inventors: Saikiran Sri Thunuguntla, Bengaluru (IN); Sreenivasulu Nallapati, Bengaluru (IN)

(73) Assignee: Intuit Inc., Mountain View, CA (US)

( * ) Notice: Subject to any disclaimer, the term of this patent is extended or adjusted under 35 U.S.C. 154(b) by 29 days.

(21) Appl. No.: 17/510,714

(22) Filed: Oct. 26, 2021

(51) Int. Cl.
*G06F 16/242* (2019.01)
*G06F 16/2457* (2019.01)

(52) U.S. Cl.
CPC .... *G06F 16/24578* (2019.01); *G06F 16/2423* (2019.01); *G06F 16/24575* (2019.01)

(58) Field of Classification Search
CPC .......... G06F 16/24578; G06F 16/2423; G06F 16/24575
See application file for complete search history.

(56) References Cited

U.S. PATENT DOCUMENTS

| | | | | |
|---|---|---|---|---|
| 11,442,945 | B1* | 9/2022 | Tsai | G06N 7/005 |
| 2006/0136451 | A1* | 6/2006 | Denissov | G06F 11/3438 |
| 2006/0173828 | A1* | 8/2006 | Rosenberg | G06F 16/9535 |
| 2007/0073748 | A1* | 3/2007 | Barney | G06F 16/95 |
| | | | | 707/E17.093 |
| 2008/0086488 | A1* | 4/2008 | Nomula | G06F 40/232 |
| 2010/0094835 | A1* | 4/2010 | Lu | G06F 16/951 |
| | | | | 707/E17.143 |
| 2016/0098737 | A1* | 4/2016 | Berajawala | G06F 16/24578 |
| | | | | 705/7.32 |
| 2020/0334307 | A1* | 10/2020 | Prasad | G06F 16/9535 |
| 2022/0050847 | A1* | 2/2022 | Scebold | G06F 16/24578 |

* cited by examiner

*Primary Examiner* — Jorge A Casanova
(74) *Attorney, Agent, or Firm* — Paradice & Li LLP

(57) ABSTRACT

Systems and methods for generating augmented search results are disclosed. An example method may be performed by one or more processors of a ranking system and include receiving a search query, generating, for each respective data asset of a plurality of data assets, a query relevancy score indicating a likelihood that the respective data asset is relevant to the search query, retrieving, for each of a number of potentially relevant data assets, a utility score indicating a likelihood that the potentially relevant data asset is useful, generating, for each of the number of potentially relevant data assets, an augmented query score indicating a likelihood that the potentially relevant data asset is relevant to and useful for the search query based on the query relevancy scores and the utility scores, and generating augmented search results for the search query based on the augmented query scores.

18 Claims, 5 Drawing Sheets

AUGMENTING SEARCH RESULTS BASED ON RELEVANCY AND UTILITY

TECHNICAL FIELD

This disclosure relates generally to augmenting search results, and specifically to generating augmented search results based on relevancy and utility.

DESCRIPTION OF RELATED ART

Many organizations provide users with access to a variety of documents, tables, glossaries, and other data assets. In some instances, organizations may provide a search engine whereby users may enter a search query in an effort to find a particular data asset. For example, a user may enter a search query including the terms "employment" and "benefits," and the search engine may provide the user with links to a number of data assets having the terms "employment" and/or "benefits" in their filenames, such as according to a startsWith or an endsWith function. Some organizations may also provide users with various usage information (such as creation time, view count, or the like) such that users may, for example, manually sort documents based on a most recent creation time.

Although such search strategies may be sufficient for relatively small numbers of data assets, when the number of data assets is relatively large, search results may become crowded with irrelevant and/or useless data assets, which may cause users to waste valuable time and effort attempting to find a data asset that best meets their needs. For example, if the number of data assets is on the order of hundreds of thousands, a conventional system may return hundreds or thousands of irrelevant and/or useless search results, such as empty tables, misnamed files, copies, outdated versions, or the like. Furthermore, even if one or more terms of a search query are included within a data asset's filename, the content of the data asset may still be irrelevant and/or fail to meet the expectations of the user. Similarly, even if a data asset is useful for other users (as indicated by a high number of views, for example), the data asset may still fail to provide the functionality that the user is seeking. Other factors may also cause conventional systems to generate meaningless results, such as a partial search term (e.g., employ) within a search query, a misspelled search query (e.g., employment), or a delimiter within a data asset's filename (e.g., employment % benefits).

Therefore, it is desirable for systems to generate more meaningful search results that are both relevant to and useful for user search queries.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for generating augmented search results. An example method may be performed by one or more processors of a ranking system and include receiving a search query, generating, for each respective data asset of a plurality of data assets, a query relevancy score indicating a likelihood that the respective data asset is relevant to the search query according to a relevancy scoring algorithm, identifying a number of potentially relevant data assets among the plurality of data assets based on the query relevancy scores, retrieving, for each of the number of potentially relevant data assets, a utility score indicating a likelihood that the potentially relevant data asset is useful according to a utility scoring algorithm, generating, for each of the number of potentially relevant data assets, an augmented query score indicating a likelihood that the potentially relevant data asset is relevant to and useful for the search query based on the query relevancy scores and the utility scores, and generating augmented search results for the search query based on the augmented query scores.

In some implementations, each respective data asset of the plurality of data assets includes metadata fields that store values indicative of characteristics of the respective data asset, and the method may further include generating a data assets database including the plurality of data assets, extracting separated values from the metadata fields based on delimiters included within the values stored in the metadata fields, constructing a set of n-grams from ones of the separated values associated with at least a first metadata field of the metadata fields, where the first metadata field stores values indicative of at least one of a filename of the respective data asset or a qualified name of the respective data asset, and generating a split terms index including the separated values and the set of n-grams, where generating the query relevancy score is based at least in part on the split terms index.

In some other implementations, the search query includes one or more search terms including at least a partial search term, and generating the query relevancy score includes generating a partial term relevancy score for the partial search term based on the separated values and the set of n-grams included in the split terms index, the partial term relevancy score indicating a likelihood that the respective data asset is relevant to the partial search term, generating a term relevancy score for each respective remaining term from the search query based on the separated values included in the split terms index, the term relevancy score indicating a likelihood that the respective data asset is relevant to the respective remaining term, and generating the query relevancy score for the respective data asset based on the partial term relevancy score generated for the respective data asset and the term relevancy scores generated for the respective data asset.

In some aspects, the relevancy scoring algorithm predicts a relevancy of the respective data asset to the search query based on a combination of matching techniques, where the combination of matching techniques includes at least one of a custom weighting technique, a fuzzy approximation technique, a term proximity technique, a term order technique, a term quantity technique, an n-gram technique, or an asset type penalization technique. In some instances, the custom weighting technique assigns relatively higher custom weights to values extracted from a first set of metadata fields deemed to have relatively more significance to predicting the relevancy of the respective data asset and assigns relatively lower custom weights to values extracted from a second set of metadata fields deemed to have relatively less significance to predicting the relevancy of the respective data asset.

In some other aspects, the utility scoring algorithm generates the utility scores for each respective data asset based on custom weights applied to values stored in usage-based metadata fields associated with the respective data asset. In some instances, the values stored in the usage-based metadata fields are indicative of at least one of a popularity of the respective data asset, a usage of the respective data asset, a number of aggregate reads of the respective data asset, a number of aggregate writes to the respective data asset, a most recent refresh time for the respective data asset, a quality of the respective data asset, a view count for the respective data asset, or a number of queries executed on the respective data asset.

In some aspects, generating the augmented query score is based on an augmented scoring algorithm including a first custom weight applied to the query relevancy score and a second custom weight applied to the utility score, where the first custom weight is different than the second custom weight. In some implementations, the method may further include receiving the search query from a user, identifying a number of highest ranking data assets based on the augmented query scores, ordering the number of highest ranking data assets from highest augmented query score to lowest augmented query score, where generating the augmented search results is based on the ordering, and providing the augmented search results to the user in real-time.

Another innovative aspect of the subject matter described in this disclosure can be implemented in a system. An example system may include one or more processors and a memory storing instructions for execution by the one or more processors. Execution of the instructions may cause the system to perform operations including receiving a search query, generating, for each respective data asset of a plurality of data assets, a query relevancy score indicating a likelihood that the respective data asset is relevant to the search query according to a relevancy scoring algorithm, identifying a number of potentially relevant data assets among the plurality of data assets based on the query relevancy scores, retrieving, for each of the number of potentially relevant data assets, a utility score indicating a likelihood that the potentially relevant data asset is useful according to a utility scoring algorithm, generating, for each of the number of potentially relevant data assets, an augmented query score indicating a likelihood that the potentially relevant data asset is relevant to and useful for the search query based on the query relevancy scores and the utility scores, and generating augmented search results for the search query based on the augmented query scores.

In some implementations, each respective data asset of the plurality of data assets includes metadata fields that store values indicative of characteristics of the respective data asset, and execution of the instructions may cause the system to perform operations further including generating a data assets database including the plurality of data assets, extracting separated values from the metadata fields based on delimiters included within the values stored in the metadata fields, constructing a set of n-grams from ones of the separated values associated with at least a first metadata field of the metadata fields, where the first metadata field stores values indicative of at least one of a filename of the respective data asset or a qualified name of the respective data asset, and generating a split terms index including the separated values and the set of n-grams, where generating the query relevancy score is based at least in part on the split terms index.

In some other implementations, the search query includes one or more search terms including at least a partial search term, and generating the query relevancy score includes generating a partial term relevancy score for the partial search term based on the separated values and the set of n-grams included in the split terms index, the partial term relevancy score indicating a likelihood that the respective data asset is relevant to the partial search term, generating a term relevancy score for each respective remaining term from the search query based on the separated values included in the split terms index, the term relevancy score indicating a likelihood that the respective data asset is relevant to the respective remaining term, and generating the query relevancy score for the respective data asset based on the partial term relevancy score generated for the respective data asset and the term relevancy scores generated for the respective data asset.

In some aspects, the relevancy scoring algorithm predicts a relevancy of the respective data asset to the search query based on a combination of matching techniques, where the combination of matching techniques includes at least one of a custom weighting technique, a fuzzy approximation technique, a term proximity technique, a term order technique, a term quantity technique, an n-gram technique, or an asset type penalization technique. In some instances, the custom weighting technique assigns relatively higher custom weights to values extracted from a first set of metadata fields deemed to have relatively more significance to predicting the relevancy of the respective data asset and assigns relatively lower custom weights to values extracted from a second set of metadata fields deemed to have relatively less significance to predicting the relevancy of the respective data asset.

In some other aspects, the utility scoring algorithm generates the utility scores for each respective data asset based on custom weights applied to values stored in usage-based metadata fields associated with the respective data asset. In some instances, the values stored in the usage-based metadata fields are indicative of at least one of a popularity of the respective data asset, a usage of the respective data asset, a number of aggregate reads of the respective data asset, a number of aggregate writes to the respective data asset, a most recent refresh time for the respective data asset, a quality of the respective data asset, a view count for the respective data asset, or a number of queries executed on the respective data asset.

In some aspects, generating the augmented query score is based on an augmented scoring algorithm including a first custom weight applied to the query relevancy score and a second custom weight applied to the utility score, where the first custom weight is different than the second custom weight. In some implementations, execution of the instructions may cause the system to perform operations further including receiving the search query from a user, identifying a number of highest ranking data assets based on the augmented query scores, ordering the number of highest ranking data assets from highest augmented query score to lowest augmented query score, where generating the augmented search results is based on the ordering, and providing the augmented search results to the user in real-time.

Another innovative aspect of the subject matter described in this disclosure can be implemented as a non-transitory computer-readable medium storing instructions that, when executed by one or more processors of a system, cause the system to perform operations. Example operations may include receiving a search query, generating, for each respective data asset of a plurality of data assets, a query relevancy score indicating a likelihood that the respective data asset is relevant to the search query according to a relevancy scoring algorithm, identifying a number of potentially relevant data assets among the plurality of data assets based on the query relevancy scores, retrieving, for each of the number of potentially relevant data assets, a utility score indicating a likelihood that the potentially relevant data asset is useful according to a utility scoring algorithm, generating, for each of the number of potentially relevant data assets, an augmented query score indicating a likelihood that the potentially relevant data asset is relevant to and useful for the search query based on the query relevancy scores and the utility scores, and generating augmented search results for the search query based on the augmented query scores.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
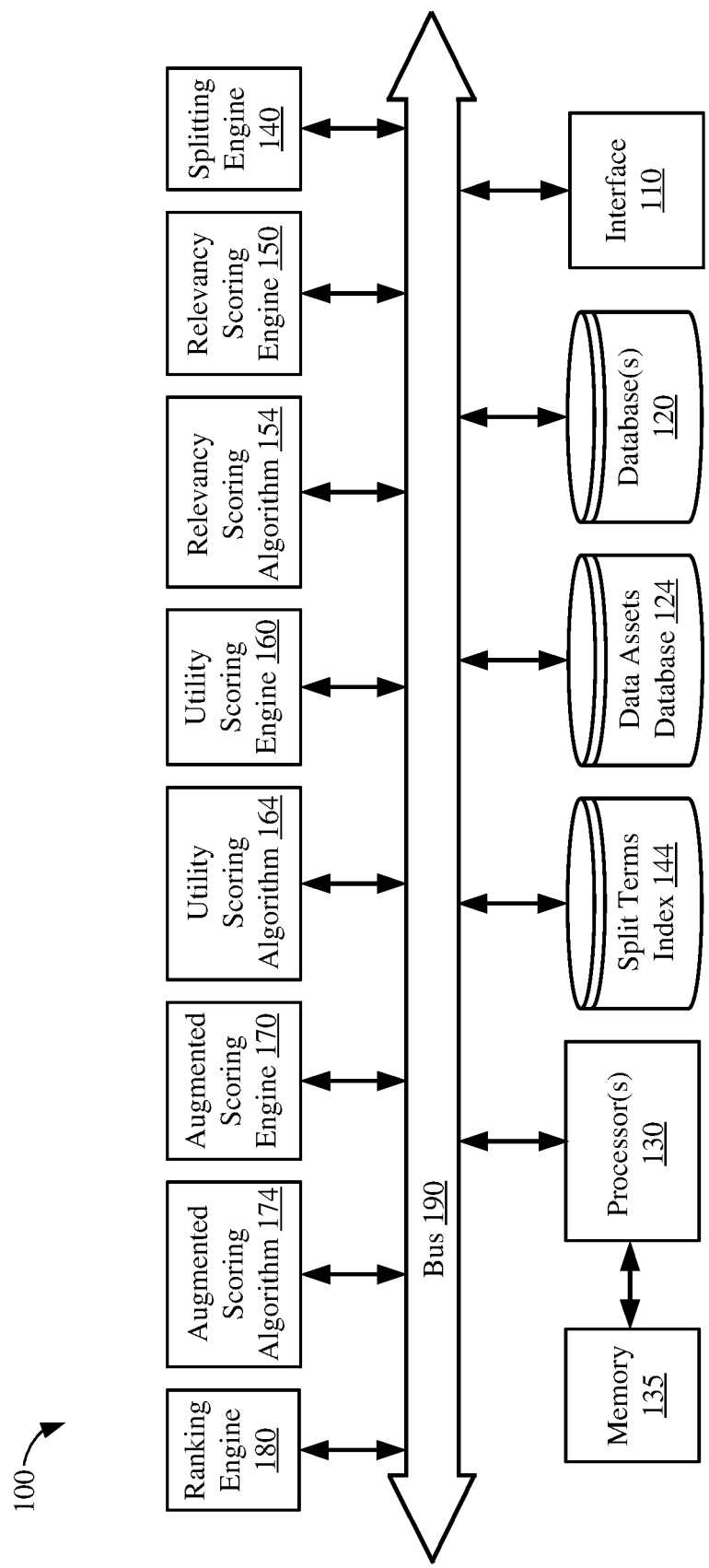
FIG. 1 shows a ranking system, according to some implementations.

As described above, it is desirable for computer-based systems to generate meaningful search results in response to user queries. Implementations of the subject matter described in this disclosure may be used in generating augmented search results based on predicting a relevancy and a utility for potential search results.

Specifically, implementations of the subject matter described in this disclosure may be used in predicting a likelihood that a given search result is relevant to a given search query based on a relevancy scoring algorithm, predicting a likelihood that the given search result is useful based on a utility scoring algorithm, and predicting a likelihood that the given search result is relevant to and useful for the given search query based on an augmented scoring algorithm that combines results from the relevancy scoring algorithm and the utility scoring algorithm.

In some implementations, the relevancy scoring algorithm predicts a relevancy of a data asset to a search query based on a combination of matching techniques, such as at least one of a custom weighting technique, a fuzzy approximation technique, a term proximity technique, a term order technique, a term quantity technique, an n-gram technique, or an asset type penalization technique. In some other implementations, the utility scoring algorithm predicts a utility of a data asset based on custom weights applied to values stored in usage-based metadata fields associated with the data asset, such as values indicative of at least one of popularity, usage, reads, writes, refreshes, quality, view count, queries, and so on. In these and other manners, implementations of the subject matter described in this disclosure may provide one or more benefits such as improving user experience, identifying relevant data assets, identifying useful data assets, identifying relevant and useful data assets, enhancing workflow, reducing user time and effort, reducing system processing and/or memory resources, dynamically ranking search results in real-time, reducing project turnaround times, increasing user retention, and so on.

For purposes of discussion herein, a "system" may refer to any appropriate system for generating and/or ranking search results in response to a search query, such as where each of the search results points to one of a plurality of available data assets.

For purposes of discussion herein, a "data asset" may refer to any appropriate electronic file or asset accessible by a system user, including but not limited to a listing of machine learning features, a relational dataset, a data lake dataset, a Kafka topic, a message feed, a schema, a blueprint, an application, a table, a stream processor, a software platform, a glossary, a glossary term, an account, a calculator, a hive table, a column, an entity, an event, an interface, a map, a server, a team, or the like. In some aspects, a data asset may include a webpage, an image, a video, an audio file, a discussion thread, a communication interface, or the like. A data asset may be associated with (or otherwise "include") one or more fields (or "metadata fields") that store values (or "metadata values") indicative of characteristics of the data asset, where the values may be generated automatically and/or manually entered by a human. As used herein, a data asset "having" a metadata value may refer to a data asset associated with a metadata field storing the metadata value. In some instances, a metadata field may not include a value or may include a NULL value.

For purposes of discussion herein, a "characteristic" of a data asset may refer to any appropriate parameter or attribute associated with the data asset, including but not limited to a classification of the data asset, a creation time for the data asset, a creator of the data asset, a most recent update time for the data asset, a most recent updater of the data asset, a title of the data asset, a description of the data asset, a term within the data asset, an account number associated with the data asset, a documentation status of the data asset, a number of columns in the data asset, at least one column name in the data asset, a most recent access time for the data asset, a most recent write time for the data asset, a name of the data asset, a qualified name of the data asset, an owner of the data asset, a size of the data asset, a number of files associated with the data asset, a retention of the data asset, a storage location for the data asset, a source type of the data asset, a standardized name for the data asset, a table type associated with the data asset, a temporary status associated with the data asset, a lineage of the data asset, one or more relationships of the data asset, an audit associated with the data asset, a schema associated with the data asset, a number of rows in the data asset, a refresh time for the data asset, a column partition associated with the data asset, an administrator for the data asset, one or more users of the data asset, or any other appropriate parameter or attribute associated with the data asset.

For purposes of discussion herein, a "separated" (or "split") term or value may refer to one or more characters, values, or both, extracted from a given field (such as a metadata field) associated with a given data asset. As used herein, a "value" may refer to a string or substring of one or more numbers (e.g., 16842), letters (e.g., halves), or delimiters (e.g., @), whitespace (e.g.,), a combination thereof, or a combination of any other appropriate characters. As used herein, a "term" may refer to any string or substring of characters included within a search query, such as "employment," "empl," or the like. In some implementations, the extracted terms or values may be split based on at least one delimiter included within the term or value, as further described below. Non-limiting examples of delimiters may include any form of a quote, a comma, a semicolon, a bracket, a brace, a pipe, a slash, an underscore, a dollar sign, a parentheses, a question mark, a percent sign, a period, an equal sign, a colon, a locator, an ampersand, an at symbol, a tilde, a caret, an exclamation point, a pound sign, an asterisk, a hyphen, a dash, a plus sign, an equal sign, or any other appropriate delimiter.

For purposes of discussion herein, a "user" or "system user" may refer to a user of the system, and a user may "use the system" by entering a search query including one or more search terms. In some implementations, the one or more search terms may include at least one of a partial search term (e.g., emp) or one or more completed (or "non-partial") search terms (e.g., employment). Non-partial search terms may also be referred to herein as "remaining terms" when the search query includes at least one partial search term. In some instances, one or more of the search terms may be misspelled.

For purposes of discussion herein, a search query is "entered" immediately upon a user inputting a particular number (such as 1, 3, 5, or the like) of characters into a search interface—that is, the system may "receive" a search query prior to, or in lieu of, a user "submitting" a search query, such as by pressing Enter or by tapping or clicking on a Search button. As used herein, a search query may be "received" from any appropriate source, such as a device of a user (e.g., a smartphone, a tablet, a personal computer, or a different suitable electronic device), a device communicatively coupled to and/or associated with the system, a data store (e.g., a memory, a database, an index, or the like), an interface (e.g., a user interface), an output of an algorithm, one or more computer-based engines or modules, or any other suitable source.

For purposes of discussion herein, a data asset is "relevant to" a search query or term if one or more predictive models (such as the relevance-based scoring engines and algorithms described herein) predict that there is a relatively high likelihood that the data asset will be relevant to the search query or term or otherwise meet the expectations and/or intentions of the user that entered (or is entering) the search query or term.

For purposes of discussion herein, a data asset is "useful" if one or more predictive models (such as the usefulness-based scoring engines and algorithms described herein) predict that there is a relatively high likelihood that the data asset is useful or otherwise functionally satisfy and/or be practical for the needs of a user.

Various implementations of the subject matter disclosed herein provide one or more technical solutions to the technical problem of improving the functionality of computer-based ranking systems, such as by generating augmented search results based on predicting which of a plurality of data assets have the highest likelihoods of being both relevant to and useful for a given search query based on a combination of predictive scoring engines and algorithms. Various aspects of the present disclosure provide specific steps describing how this specific result is accomplished and how this specific result realizes an improvement in computer functionality by means of a unique computing solution to a unique computing problem that did not exist prior to an electronic or online ranking system that can predict the most relevant and useful data assets for a given search query in real-time. Predicting, based on a combination of multiple predictive scoring models, likelihoods that given data assets will both meet the expectations of and functionally satisfy the needs of a user entering a search query in real-time cannot be performed in the human mind, much less using pen and paper. As such, implementations of the subject matter disclosed herein provide meaningful improvements to the performance of computer-based ranking systems, which are not an abstract idea such as organizing human activity or a mental process that can be performed in the human mind.

FIG. 1 shows a ranking system 100, according to some implementations. The ranking system 100 may also be referred to herein as "the system 100." Various aspects of the ranking system 100 disclosed herein may be applicable for generating augmented search results. The ranking system 100 includes an interface 110, one or more databases 120, a data assets database 124, one or more processors 130, a memory 135 coupled to the processor 130, a splitting engine 140, a split terms index 144, a relevancy scoring engine 150, a relevancy scoring algorithm 154, a utility scoring engine 160, a utility scoring algorithm 164, an augmented scoring engine 170, an augmented scoring algorithm 174, and a ranking engine 180. In some implementations, the various components of the ranking system 100 may be interconnected by at least a data bus 190, as depicted in the example of FIG. 1. In some other implementations, the various components of the ranking system 100 may be interconnected using other suitable signal routing resources. Input data may be any suitable data, such as a search query and one or more metadata values, used to generate augmented search results. While the ranking system 100 and the examples herein are described with reference to ranking search results based on relevancy and utility, the ranking system 100 and aspects of the present disclosure may be used for ranking other suitable electronic data structures based on any suitable combination of other ranking standards, among other suitable tasks.

The interface 110 may be one or more input/output (I/O) interfaces to receive input data (such as a search query including one or more terms) to be used in generating augmented search results. The interface 110 may also be used to provide augmented search results generated by the ranking system 100, for example, to a user. The interface 110 may also be used to provide or receive other suitable information, such as computer code for updating one or more programs stored on the ranking system 100, internet protocol requests and results, or results from the ranking engine 180. An example interface may include a wired interface or wireless interface to the internet or other means to communicably couple with user devices or any other suitable devices. For example, the interface 110 may include an interface with an ethernet cable to a modem, which is used to communicate with an internet service provider (ISP) directing traffic to and from user devices and/or other parties. The interface 110 may also be used to communicate with another device within the network to which the ranking system 100 is coupled, such as a smartphone, a tablet, a personal computer, or other suitable electronic device. The interface 110 may also include a display, a speaker, a mouse, a keyboard, or other suitable input or output elements that allow interfacing with the ranking system 100 by a local user or moderator.

The database 120 may store any data associated with the ranking system 100, such as one or more search queries, search terms, metadata values, exclusionary lists, JSON (JavaScript Object Notation) files, or any other appropriate data. The database 120 may also store predictive values generated using the relevancy scoring engine 150, the utility scoring engine 160, the augmented scoring engine 170, the ranking engine 180, a different appropriate component associated with the ranking system 100, and/or one or more other values used in generating the predictive values. The database 120 may be a part of or separate from the data assets database 124 and/or the split terms index 144. In some implementations, the database 120 may include a relational database capable of presenting information as data sets in tabular form and capable of manipulating the data sets using relational operators. The database 120 may use Structured Query Language (SQL) for querying and maintaining the database 120. The input data and the data sets described below may be in any suitable format for processing by the ranking system 100. For example, the data may be included in one or more JSON files or objects. In another example, the data may be in SQL compliant data sets for filtering and sorting by the ranking system 100 (such as by the processor 130).

The data assets database 124 may store data (such as metadata) associated with a plurality of data assets. The data assets database 124 may be a part of or separate from the database 120 and/or the split terms index 144. In some implementations, the metadata may be stored in a memory separate from the data assets database 124. The data assets database 124 may store (or "catalog") metadata values within metadata fields associated with the plurality of data assets, where the metadata values are indicative of various characteristics of the plurality of data assets. In some implementations, the data assets database 124 may also store utility scores associated with the plurality of data assets. In some aspects, the utility scores may be predetermined, such as by the utility scoring engine 160 in conjunction with the utility scoring algorithm 164, as further described below.

As non-limiting examples of metadata fields, a first metadata field may be a filename field that stores a value indicative of a nonunique string of characters assigned to an associated data asset (e.g., issue_events_ty21_merged), a second metadata field may be a qualifiedName field that stores a value indicative of a unique string of characters assigned to the data asset (e.g., issue.issue_events_ty21_merged), and a third metadata field may be an assetType field that stores a value indicative of a type of the data asset (e.g., hive_column, hive_table, schema, or the like). Other non-limiting examples of metadata fields may include, but are not limited to, a creationTime field that stores a value indicative of a creation time of the data asset (e.g., 20-09-30T08:42:21+05:30), a creator field that stores a value indicative of a username for a user that created the data asset (e.g., Saikiran, Sreenivasulu, or the like), a mostRecentUpdateTime field that stores a value indicative of a most recent edit time for the data asset (e.g., 21-07-31T21:42:08+05:30), an accountNumber field that stores a value indicative of an account number associated with the data asset (e.g., 248163264), a numberColumns field that stores a value indicative of a number of columns within the data asset (e.g., 84), a nameColumn field that stores values indicative of one or more column names within the data asset (e.g., ID, Feature1, Feature2, Label, or the like), and so on.

In some implementations, one or more of the metadata fields may store values indicative of usage-based characteristics of the plurality of data assets, such as reads, writes, queries, views, or the like. As non-limiting examples of "usage-based metadata fields," a numberViews field may store a value indicative of a total number of views of a data asset (e.g., 2142), a numberQueries field may store a value indicative of a total number of queries run on the data asset (e.g., 84422), and so on. In some instances, one or more of the usage-based metadata fields may store aggregated values generated based on values stored in other usage-based metadata fields. For example, a viewScore field may store an aggregated value generated based on values stored in view-based fields (e.g., a numberViews field, a simultaneousViews field, or the like), a queryScore field may store an aggregated value generated based on values stored in query-based fields (e.g., a numberQueries field, an averageQueries field, or the like), a popularityScore field may store an aggregated value generated based on values stored in fields related to popularity (e.g., an aggregateReads field, an aggregateWrites field, a lastRefreshTime field, a tableQuality field, or the like). In some implementations, the aggregated values may be provided to and/or generated by one or more of the relevancy scoring engine 150 in conjunction with the relevancy scoring algorithm 154, the utility scoring engine 160 in conjunction with the utility scoring algorithm 164, and/or the augmented scoring engine 170 in conjunction with the augmented scoring algorithm 174, as described in more detail below.

The processor 130 may include one or more suitable processors capable of executing scripts or instructions of one or more software programs stored in system 100, such as within the memory 135. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 130 may include a combination of computing devices, such as a combination of a DSP and a microprocessor, a plurality of microprocessors, one or more microprocessors in conjunction with a DSP core, or any other suitable configuration.

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The splitting engine 140 may be used to generate a split terms index, such as the split terms index 144. For example, the splitting engine 140 may extract and separate (or "split") values from the metadata fields described with respect to the data assets database 124. In some implementations, the splitting engine 140 may extract the separated values based on one or more delimiters included within the metadata values stored in the metadata fields. For example, if a metadata value is a string of characters including one delimiter (e.g., employee % benefits), the splitting engine 140 may extract and split the string of characters into two separate strings (employee and benefits) based on the delimiter (%). The separated strings (or substrings) may be referred to herein as "separated values" and/or "separated terms." The splitting engine 140 may store or index the separated values in the split terms index 144 and/or provide the separated terms to at least one of the relevancy scoring engine 150 or the augmented scoring engine 170 for further processing.

As a non-limiting example of generating a portion of the split terms index 144, a given data asset may include a qualifiedName metadata field storing a unique string of characters assigned to the given data asset, such as issue.issue_events_ty21_merged, and the splitting engine 140 may split the string of characters into separated terms (issue, events, ty21, and merged) based on the delimiters (., _, _, and_, respectively) and store the separated terms in the split terms index 144, such as in a JSON file. The splitting engine 140 may associate the separated terms with the given data asset, such as by tagging the separated terms (e.g., in the JSON file) with a unique identifier (ID) of the given data asset. For example, if the term events is extracted from metadata values associated with a first data asset (e.g., unique ID, Doc1234) and a second data asset (e.g., unique ID, Doc5678), the term events may be listed as events→Doc1234, Doc5678 in the split terms index 144. Thereafter, for this example, if a search query includes the term events, the relevancy scoring engine 150 may identify (or "flag") Doc1234 and Doc5678 as relevant to the search query or as potential search results. It is to be understood that each of the separated terms in the split terms index 144 may be associated with any number of data assets. Upon generation, the split terms index 144 may, in some aspects, operate similar to an inverted index in conjunction with an information retrieval algorithm, such as an Elasticsearch inverted index.

In some implementations, the splitting engine 140 separates values from one or more specified metadata fields (e.g., a name metadata field, a qualifiedName metadata field, or the like) and refrains from separating values from one or more other specified metadata fields (e.g., a createDate metadata field, a deployedDate metadata field, an assetID metadata field, or the like). In this manner, the splitting engine 140 may generate the split terms index 144 based on metadata fields that store values deemed to have relatively more significance for determining the relevancy of a data asset to a search query.

The splitting engine 140 may indicate (such as in the split terms index 144) the metadata field from which a separated value was extracted. For example, the splitting engine 140 may indicate that the separated terms issue, events, ty21, and merged were extracted from the qualifiedName metadata field, and that the separated terms 2021, 07, 31, T, 21, 42, 08, 05, and 30 were extracted from the createDate metadata field. In some instances, the splitting engine 140 may indicate the metadata field from which a value was extracted for one or more specified metadata fields (e.g., name, qualifiedName, or the like). In some other instances, the splitting engine 140 may refrain from separating values extracted from one or more other specified metadata fields (e.g., type). In this manner, a search query including type: hive_table, for example, will return data assets exactly matching hive_table in the type metadata field, rather than data assets including a partial match (e.g., hive and/or table) in the type metadata field. In some instances, the splitting engine 140 may group values extracted from a specified set of metadata fields into a "catch-all" metadata field, which may be referred to herein as an entityText metadata field.

As further described below, relatively higher weights (e.g., 3X) may be assigned to values extracted from metadata fields deemed to have relatively more significance for determining relevancy (such as name) and relatively lower weights (e.g., 1X) may be assigned to values extracted from metadata fields deemed to have relatively less significance for determining relevancy (such as title, mostRecentUpdateTime, accountNumber, typeName, entityText, or the like). In some implementations, other custom weights (e.g., 2X, 4X, or the like) may be assigned to values extracted from other metadata fields, such as a 2X weight for values extracted from qualifiedName, as further described below.

In some implementations, the splitting engine 140 generates (or "constructs") n-grams from a portion of the separated values and stores the n-grams in the split terms index 144. As a non-limiting example, the terms events and merged may be extracted from a qualifiedName metadata field and the constructed n-grams may include eve, even, event, events, mer, merg, merge, and merged. In some implementations, the separated values are stored separate from the n-grams. In some implementations, a minimum number of characters for an n-gram may be 3, and in some other implementations, the minimum number of characters for an n-gram may be less than or greater than 3. As further described below, the ranking system 100 may use the n-grams and separated values when analyzing a partial search term and may refrain from using the n-grams when analyzing non-partial search terms. In some implementations, the splitting engine 140 generates the n-grams from metadata values stored in specified metadata fields (e.g., name) and refrains from generating n-grams from metadata values stored in other metadata fields (e.g., deployedDate). In this manner, the ranking system 100 may reserve processing and memory resources for constructing n-grams for metadata fields deemed to have relatively more significance to relevancy. In some instances, the split terms index 144 may store the separated values and/or the n-grams in lowercase.

The relevancy scoring engine 150 may be used to predict, in conjunction with the relevancy scoring algorithm 154, which of a plurality of data assets (such as in the data assets database 124) have the highest likelihood of being relevant to a given search query. For example, the relevancy scoring engine 150 may receive a search query and generate, for each of the plurality of data assets, a query relevancy score indicating a likelihood that the respective data asset is relevant to the search query. The search query may include one or more search terms such as a partial search term and/or a number of non-partial search terms (or "remaining terms"), and the relevancy scoring engine 150 may generate a partial term relevancy score for the partial search term (if there is one), generate a term relevancy score for any non-partial or otherwise remaining search terms, and generate query relevancy scores for the data assets using the partial term relevancy scores and the term relevancy scores. In some implementations, the relevancy scoring engine 150 may conserve processing and memory resources by using the set of n-grams to generate relevancy scores for partial search terms, which may be relatively more likely to match one of the n-grams, and by refraining from using the set of n-grams to generate relevancy scores for non-partial search terms, which may be relatively less likely to match one of the n-grams. The relevancy scoring engine 150 may identify relevant data assets among the plurality of data assets based on the query relevancy scores, and provide an indication of the relevant data assets and/or the query relevancy scores to at least one of the utility scoring engine 160 or the augmented scoring engine 170 for further processing. For example, a search query may include a first search term and a second search term, and the relevancy scoring engine 150 in conjunction with the relevancy scoring algorithm 154 may identify (e.g., allocate a number of "relevancy points"

to) a number of data assets predicted to be relevant (or "potentially relevant") to the search query, such as data assets associated with metadata values that include the first search term and/or the second search term. In some other implementations, a data asset may be included among the number of relevant data assets when the first search term is separated by no more than a maximum number (e.g., 5) of characters strings (sans delimiters) within the metadata values associated with the data asset.

In some implementations, the relevancy scoring engine 150 may filter particular data assets from the number of relevant data assets, such as data assets that meet (or fail to meet) one or more conditions. For example, the relevancy scoring engine 150 may filter data assets that have a specified string of characters (e.g., o4o) within a specified metadata field (e.g., name) or any other metadata field. As another example, the relevancy scoring engine 150 may filter outdated data assets, such as a previous version of a more recent data asset. In some implementations, the relevancy scoring engine 150 may filter outdated data assets associated with a specified data asset type, such as a previous version of a hive table. In some other implementations, the relevancy scoring engine 150 may filter data assets associated with specified types, such as a column, a leaf-node, or the like. In some instances, if a search query indicates a desired data asset type (e.g., schema), the relevancy scoring engine 150 may filter data assets not associated with the desired data asset type.

The relevancy scoring engine 150 may generate the query relevancy scores based on a combination of matching techniques. For example, the relevancy scoring engine 150 may generate one or more first values indicative of a relevancy of a given data asset based on a first matching technique, generate one or more second values indicative of a relevancy of the given data asset based on a second matching technique, and generate a query relevancy score for the given data asset based on inputting the first and second values into the relevancy scoring algorithm 154. Non-limiting examples of matching techniques include at least one of a custom weighting technique, a fuzzy approximation technique, a term proximity technique, a term order technique, a term quantity technique, an n-gram technique, and/or an asset type penalization technique, as are further described below. It is to be understood that the relevancy scoring algorithm 154 may incorporate values generated based on any number of matching techniques.

As a non-limiting example of generating a query relevancy score based on a combination of matching techniques, a search query may include one partial search term ("first term") and one non-partial search term ("second term"), and the relevancy scoring engine 150 in conjunction with the relevancy scoring algorithm 154 may allocate a first number of relevancy points ($r_1$) to a first data asset for the first term based on a first matching technique (e.g., a custom weighting technique), allocate a second number of relevancy points ($r_2$) to the first data asset for the first term based on a second matching technique (e.g., a fuzzy approximation technique), allocate a third number of relevancy points ($r_3$) to the first data asset for the second term based on the first matching technique, allocate a fourth number of relevancy points ($r_4$) to the first data asset for the second term based on the second matching technique, allocate a fifth number of relevancy points ($r_5$) to a second data asset for the first term based on the first matching technique, allocate a sixth number of relevancy points ($r_6$) to the second data asset for the first term based on the second matching technique, allocate a seventh number of relevancy points ($r_7$) to the second data asset for the second term based on the first matching technique, and allocate an eighth number of relevancy points ($r_8$) to the second data asset for the second term based on the second matching technique. Thereafter, the relevancy scoring algorithm 154 may, for this example, sum the relevancy points allocated to the first data asset based on the first matching technique (e.g., $r_1+r_2=s_1$), sum the relevancy points allocated to the first data asset based on the second matching technique (e.g., $r_3+r_4=s_2$), sum the relevancy points allocated to the second data asset based on the first matching technique (e.g., $r_5+r_6=s_3$), and sum the relevancy points allocated to the second data asset based on the second matching technique (e.g., $r_7+r_8=s_4$). Thereafter, for this example, the relevancy scoring algorithm 154 may determine a total number of relevancy points allocated to the first data asset (e.g., $s_1+s_2=QRS_1$) and a total number of relevancy points allocated to the second data asset (e.g., $s_3+s_4=QRS_2$), where $QRS_1$ is indicative of a likelihood that the first data asset is relevant to the search query, and where $QRS_2$ is indicative of a likelihood that the second data asset is relevant to the search query. For this example, if $QRS_1>QRS_2$, the first data asset is predicted to have more relevance to the search query than the second data asset. In this manner, the relevancy scoring engine 150 in conjunction with the relevancy scoring algorithm 154 may predict a relevancy of a given data asset to a given search query based on a combination of matching techniques.

In some instances, the relevancy scoring engine 150 may provide the query relevancy scores to the augmented scoring engine 170 for further processing. In some other instances, the relevancy scoring engine 150 may indicate a number of potentially relevant data assets, such as data assets having a query relevancy score greater than a specified value or a top x relevancy scoring data assets. It is to be understood that the relevancy scoring engine 150 may use the relevancy scoring algorithm 154 to generate a query relevancy score for any number (including all) of the plurality of data assets (such as thousands, millions, or more) and identify any number of relevant data assets among the plurality of data assets based on the query relevancy scores.

The combination of matching techniques may incorporate a "custom weighting" matching technique, whereby a custom weighting portion of the relevancy scoring algorithm 154 may apply relatively higher custom weights to metadata values extracted from metadata fields deemed to have relatively more significance to relevancy, and assign relatively lower custom weights to metadata values extracted from metadata fields deemed to have relatively less significance to relevancy, as described above with respect to the splitting engine 140 and the split terms index 144. As a non-limiting example, the relevancy scoring algorithm 154 may apply a custom weight of 3X to values extracted from a name metadata field, a custom weight of 2X to values extracted from a qualifiedName metadata field, and a custom weight of 1X to values extracted from other metadata fields, such as title, mostRecentUpdateTime, accountNumber, typeName, entityText, or the like. For this example, the relevancy scoring engine 150 receives a search query including one non-partial search term, events, which is listed in the split terms index 144 as events→Doc1234, Doc5678—that is, the term events appears at least once within the metadata fields for Doc1234 and Doc5678. For this example, the split terms index 144 further indicates that events was extracted once from the name metadata field for Doc1234, once from the title metadata field for Doc5678, once from the mostRecentUpdateTime metadata field for Doc5678, once from the accountNumber metadata field for Doc5678, and once from the typeName metadata field for Doc5678. Since the events search term appears once (X=1) in the name metadata field (assigned a 3X weight) for Doc1234, the relevancy scoring algorithm 154 may allocate 3(1)=3 relevancy points to Doc1234 for the events search term, and since the events search term appears in four metadata fields (each assigned a 1X weight) for Doc5678, the relevancy scoring algorithm 154 may allocate the maximum number of relevancy points (max(1(1), 1(1), 1(1), 1(1))=1 relevancy point) to Doc5678 for the events search term. Thus, for this example, according to the custom weighting portion of the relevancy scoring algorithm 154, Doc1234 is more relevant (3>1) to the events search term than Doc5678 (and thus may receive more relevancy points), even though events appears more times within the metadata fields for Doc5678. In this manner, the custom weighting portion of the relevancy scoring algorithm 154 may identify a "best" matching data asset rather than a "most" matching data asset.

The combination of matching techniques may incorporate a "fuzzy approximation" matching technique, which, in some implementations, may integrate one or more aspects of a Damerau-Levenshtein distance matching technique. For example, the relevancy scoring engine 150 may determine, for a given data asset, a minimum number of modifications (e.g., insertions, deletions, substitutions, and/or transpositions) required to transform a given search term into a string associated with the given data asset, allocate relatively more relevancy points to the given data asset when the required number of modifications is relatively lower, and allocate relatively fewer relevancy points to the given data asset when the required number of modifications is relatively higher. In some implementations, the relevancy scoring engine 150 in conjunction with the relevancy scoring algorithm 154 may refrain from allocating relevancy points to the given data asset if the required number of modifications is greater than a specified value (e.g., 4 or any other suitable value).

As a non-limiting example of incorporating a fuzzy approximation matching technique, the relevancy scoring engine 150 may receive a search query including one search term (e.g., evnts), and determine a number of modifications required to transform the search term into a particular separated value (e.g., events) included in the split terms index 144. For this example, the relevancy scoring engine 150 determines that the number of modifications required to transform evnts into events is 1, such as by inserting 'e' between 'n' and 'v' in evnts. For this example, since 1 is less than a specified value (e.g., 4 or any other suitable value), the relevancy scoring engine 150 in conjunction with the relevancy scoring algorithm 154 may allocate relevancy points to data assets associated with events in the split terms index 144 as if the search term was entered as events. As an example of further incorporating the custom weighting portion of the relevancy scoring algorithm 154, the relevancy scoring engine 150 may determine that the original search term (e.g., evnts) was extracted from a low-weight (e.g., 1X) metadata field (e.g., entityText) associated with a first data asset, determine that the modified search term (e.g., events) was extracted from a high-weight (e.g., 3X) metadata field (e.g., name) associated with a second data asset, and thus allocate a higher number of additional relevancy points to the second data asset based on the custom weighting portion of the relevancy scoring algorithm 154. In some implementations, the relevancy scoring engine 150 in conjunction with the relevancy scoring algorithm 154 may allocate relatively fewer relevancy points to a data asset associated with a modified search term (e.g., evnts→events) and relatively more relevancy points to a data asset associated with an unmodified (e.g., a properly spelled) search term (e.g., events). In some instances, the number of relevancy points allocated based on a modified term may be reduced as the number of associated modifications increases, and if the number of modifications is more than a maximum value (e.g., 4), the number of relevancy points allocated may be reduced to 0. In these manners, the fuzzy approximation portion of the relevancy scoring algorithm 154 may accurately determine a relevancy of a data asset even when search terms are misspelled and/or being entered in real-time.

The combination of matching techniques may incorporate a "term proximity" matching technique, whereby the relevancy scoring engine 150 in conjunction with the relevancy scoring algorithm 154 may determine a number of terms (including 0) that appear between a first search term and a second search term, and the relevancy scoring engine 150 in conjunction with the relevancy scoring algorithm 154 may allocate relatively more relevancy points to data assets associated with metadata values having the same number of terms (sans delimiters) between the same first and second search terms, and relatively fewer relevancy points to data assets associated with metadata values having a different number of terms between the first and second search terms. As a non-limiting example, the relevancy scoring engine 150 may receive a search query including a first search term (e.g., events) and a second search term (e.g., merged), and determine that metadata values associated with Doc1234 and Doc5678 include the first and second search terms in a name metadata field. For this example, the metadata value associated with Doc1234 is issue_events.merged, and the metadata value associated with Doc5678 is issue_events.schema_merged, i.e., the number of terms between events and merged for Doc1234 is 0, and the number of terms between events and merged for Doc5678 is 1. Thus, for this example, according to the term proximity portion of the relevancy scoring algorithm 154, Doc1234 is more relevant (0<1) to the search query than Doc5678 and will thus be allocated relatively more relevancy points, even though the metadata values associated with both data assets include both the first and second search terms. In these manners, the term proximity portion of the relevancy scoring algorithm 154 may increase an accuracy of the query relevancy scores by allocating relatively more relevancy points to data assets associated with metadata values more closely matching a spacing of terms within a search query.

The combination of matching techniques may incorporate a "term order" matching technique, whereby the relevancy scoring engine 150 may determine that a first search term appears before a second search term, and the relevancy scoring engine 150 in conjunction with the relevancy scoring algorithm 154 may allocate relatively more relevancy points to data assets associated with metadata values including the first search term before the second search term, and relatively fewer relevancy points to data assets associated with metadata values including the second search term before the first search term. As a non-limiting example, a search query may include a first search term (e.g., events) followed by a second search term (e.g., merged), and the relevancy scoring engine 150 in conjunction with the relevancy scoring algorithm 154 may determine that Doc1234 and Doc5678 include the first and second search terms. For this example, the metadata value in the name metadata field for Doc1234 is issue_events.merged, and the metadata value in the name metadata field for Doc5678 is merged_issue.events. Thus, for this example, the relevancy scoring engine 150 in conjunction with the relevancy scoring algorithm 154 may allocate relatively more relevancy points to Doc1234 than to Doc5678 because events appears before merged for Doc1234, whereas events appears after merged for Doc5678. In these manners, the term order portion of the relevancy scoring algorithm 154 may increase an accuracy of the query relevancy scores by allocating relatively more relevancy points to data assets associated with metadata values closely matching an order of terms within a search query. To further incorporate the term proximity portion of the relevancy scoring algorithm 154, for this example, the relevancy scoring engine 150 may determine that 0 terms appear between events and merged for Doc1234 and that 1 term appears between events and merged for Doc5678, and thus allocate relatively more relevancy points to Doc1234 than Doc5678 according to the term proximity portion of the relevancy scoring algorithm 154.

The combination of matching techniques may incorporate an "n-gram" matching technique, whereby the relevancy scoring engine 150 may use a set of n-grams (such as in the split terms index 144) to determine a relevancy of a data asset to a partial search term. For example, a partial search term may be a search term currently being entered by a system user in real-time (e.g., event, even, eve, or the like), and the n-gram portion of the relevancy scoring algorithm 154 may allocate a number of relevancy points to data assets associated with one or more metadata values including the partial search term.

The combination of matching techniques may incorporate a "term quantity" matching technique, whereby the relevancy scoring engine 150 in conjunction with the relevancy scoring algorithm 154 may allocate relatively more relevancy points to data assets associated with metadata values including more search terms of a plurality of search terms.

As a non-limiting example of incorporating a term quantity matching technique, a search query may include four terms (such as events, merged, higher, and score), and the relevancy scoring engine 150 may determine that at least one of the four terms appears within metadata values associated with Doc12, Doc34, Doc56, and Doc78. For this example, Doc12 is associated with the term events, Doc34 is associated with the terms events and merged, Doc56 is associated with the terms events, merged, and higher, and Doc78 is associated with the terms events, merged, higher, and score, and the term quantity portion of the relevancy scoring algorithm 154 may thus allocate an increasing number of relevancy points to Doc12 (e.g., 1), Doc34 (e.g., 2), Doc56 (e.g., 3), and Doc78 (e.g., 4). In this manner, the term quantity portion of the relevancy scoring algorithm 154 may increase an accuracy of the query relevancy scores by allocating more relevancy points to data assets associated with metadata values including more terms within a search query. To further incorporate the custom weighting portion of the relevancy scoring algorithm 154, the relevancy scoring engine 150 may determine, for each of Doc12, Doc34, Doc56, and Doc78, the metadata fields from which the terms events, merged, higher, and/or score were extracted, and allocate appropriate quantities of additional relevancy points according to custom weights assigned to the metadata fields.

The combination of matching techniques may incorporate an "asset type penalization" matching technique. For example, a data asset may include a metadata field (e.g., assetType) that stores a value indicative of a "type" of the data asset (such as a hive_column type, a hive_table type, a schema type, or the like), and the relevancy scoring engine 150 in conjunction with the relevancy scoring algorithm 154 may penalize (e.g., withdraw relevancy points from and/or refrain from allocating relevancy points to) the data asset if it is associated with one of a specified set of data asset types deemed to have less relevance to search queries in general, such as a column data asset type, a leaf-node data asset type, or the like. As a non-limiting example, a search query may include one search term (e.g., table), and the relevancy scoring engine 150 may determine that the metadata values associated with Doc1234 include the term table once and that the metadata values associated with Doc5678 include the term table twice. For this example, since table appears within the metadata values associated with Doc5678 more times than for Doc1234, other portions of the relevancy scoring algorithm 154 may allocate relatively more relevancy points (e.g., 2) to Doc5678 than to Doc1234 (e.g., 1). However, for this example, if Doc1234 is of a hive_table type and Doc5678 is of a hive_column type, the relevancy scoring engine 150 in conjunction with the relevancy scoring algorithm 154 may withdraw relevancy points (e.g., 2) from Doc5678 and refrain from withdrawing relevancy points from Doc1234, even though table appears more times within the metadata values associated with Doc5678 than Doc1234. In this manner, the asset type penalization portion of the relevancy scoring algorithm 154 may refine the query relevancy scores based on penalizing particular types of data assets deemed to include a relatively high number of repeated terms, and thus, deemed to be less relevant to search queries in general.

The utility scoring engine 160 may be used to predict, in conjunction with the utility scoring algorithm 164, which of a plurality of data assets (such as in the data assets database 124) have the highest likelihood of being useful for any given search query. For example, the utility scoring engine 160 in conjunction with the utility scoring algorithm 164 may generate, for each of the plurality of data assets, a utility score indicative of a relative usefulness of the respective data asset. The utility scoring engine 160 may provide the utility scores, or otherwise make the utility scores available, to at least one of the relevancy scoring engine 150 or the augmented scoring engine 170 for further processing, such as by storing the utility scores in the database 120, the data assets database 124, in a metadata field (e.g., utilityScore) associated with the given data asset, or the like. As a non-limiting example, the utility scoring engine 160 may determine that the metadata value in the name metadata field for a first data asset ("Doc12") is events.table, determine that the metadata value in the name metadata field for a second data asset ("Doc34") is events.table_copy56, determine that the metadata value in the viewCount metadata field for Doc12 is 8482, and determine that the metadata value in the viewCount metadata field for Doc34 is 48. Thus, for this example, the utility scoring engine 160 may determine that Doc12 is relatively more popular than Doc34 based on view count and thus allocate relatively more utility points to Doc12 than Doc34. In some implementations, the utility scores may be generated based on combining two or more utility subscores, such as at least one of a viewScore, a queryScore, or a popularityScore, as further described below.

The utility scoring engine 160 in conjunction with the utility scoring algorithm 164 may generate the utility scores based on applying custom weights to metadata values extracted from a specified set of metadata fields, such as metadata fields related to a popularity and/or a usage of a data asset, which may be referred to herein as "usage-based metadata fields." For example, the utility scoring engine 160 in conjunction with the utility scoring algorithm 164 may generate a first value indicative of a utility of a data asset based on a first value stored in a first usage-based metadata field, generate a second value indicative of a utility of the data asset based on a second value stored in a second usage-based metadata field, generate a third value indicative of a utility of the data asset based on a third value stored in a third usage-based metadata field, and generate a utility score for the data asset based on applying custom weights to one or more of the first, second, and third values. In some implementations, the first, second, or third values may be generated based on an aggregation of values generated based on multiple other usage-based metadata fields, as further described below. Non-limiting examples of usage-based metadata values may include values indicative of a popularity of a data asset (such as an average rating, a number of likes, a number of appearances within a query log, a frequency of appearance within the query log, and so on), a usage of the data asset (such as a total duration), a number of aggregate reads of the data asset, a number of aggregate writes of the data asset, a most recent refresh time for the data asset, a quality of the data asset (such as a number of endorsements), a view count for the data asset, a number of queries executed on the data asset, and so on.

In some implementations, the usage-based metadata fields may include one or more per-user metadata fields that store values personalized to a given user based on the given user's previous usage of the particular data asset. For example, a first per-user metadata field (e.g., markedFavorite) may store a value (e.g., true) indicating that the user previously marked, tagged, starred, or otherwise flagged the given data asset as a favorite. As another example, a second per-user metadata field (e.g., numberSelected) may store a value (e.g., 56) indicating a number of times that the user selected the data asset when it appeared within the user's search results. Other appropriate per-user metadata fields may store other appropriate personalized values. In these manners, the utility scoring engine 160 in conjunction with the utility scoring algorithm 164 may apply relatively higher custom weights to metadata values extracted from usage-based metadata fields deemed to have more significance to usefulness (such as per-user metadata fields), and relatively lower custom weights to metadata values extracted from usage-based metadata fields deemed to have less significance to usefulness (such as a most recent refresh time). It is to be understood that the utility scoring engine 160 in conjunction with the utility scoring algorithm 164 may apply any number of custom weights and/or incorporate any number of metadata values from any number of usage-based metadata fields.

As a non-limiting example of generating a utility score, the utility scoring engine 160 in conjunction with the utility scoring algorithm 164 may allocate a first number of utility points to a data asset based on a first metadata value within a first usage-based metadata field (e.g., numberViews), allocate a second number of utility points to the data asset based on a second metadata value within a second usage-based metadata field (e.g., averageViews), allocate a third number of utility points to the data asset based on a third metadata value within a third usage-based metadata field (e.g., numberQueries), allocate a fourth number of utility points to the data asset based on a fourth metadata value within a fourth usage-based metadata field (e.g., aggregateReads), allocate a fifth number of utility points to the data asset based on a fifth metadata value within a fifth usage-based metadata field (e.g., aggregateWrites), and allocate a sixth number of utility points to the data asset based on a sixth metadata value within a sixth usage-based metadata field (e.g., lastRefresh).

In some implementations, the utility scoring engine 160 in conjunction with the utility scoring algorithm 164 may generate one or more subscores for a given data asset based on aggregating (or otherwise combining) utility points allocated based on specified groupings of usage-based metadata fields. As a non-limiting example, a "view" subscore (viewScore, $U_1$) may be generated for the given data asset based on a sum of utility points allocated based on usage-based metadata fields related to views, such as a number of views of the given data asset (e.g., $u_1$) or a number of unique users that have accessed the given data asset (e.g., $u_2$), and so on, where $U_1$ may be generated based on $u_1$ and $u_2$ for this non-limiting example. As another non-limiting example, a "query" subscore (queryScore, $U_2$) may be generated for the given data asset based on a sum of utility points allocated based on usage-based metadata fields related to queries, such as an actual number of queries for the given data asset (e.g., $u_3$) or a number of reads of the given data asset (e.g., $u_4$), and so on, where $U_2$ may be generated based on $u_3$ and $u_4$ for this non-limiting example. As another non-limiting example, a "popularity" subscore (popularityScore, $U_3$) may be generated for the given data asset based on a sum of utility points allocated based on usage-based metadata fields related to popularity, such as a number of times the given data asset is used (e.g., $u_5$), a most recent access date for the given data asset (e.g., $u_6$), an overall quality metric for the given data asset (e.g., $u_7$), a number of subscriptions to the given data asset (e.g., $u_8$), a number of users that have flagged the given data asset as a favorite (e.g., $u_9$), a number of joins for the given data asset (e.g., $u_{10}$), or a number of times the given data asset appears within a lineage (e.g., $u_{11}$), and so on, where $U_3$ may be generated based on $u_5$, $u_6$, $u_7$, $u_8$, $u_9$, $u_{10}$, and $u_{11}$ for this non-limiting example.

In some implementations, a different custom weight may be applied to each of a set of utility subscores, such as the viewScore ($U_1$), the queryScore ($U_2$), and the popularityScore ($U_3$) described above. As a non-limiting example, the utility scoring engine 160 in conjunction with the utility scoring algorithm 164 may apply a first custom weight ($w_1$) to a $U_1$ calculated for a given data asset, a second custom weight ($w_2$) to a $U_2$ calculated for the given data asset, and a third custom weight ($w_3$) to a $U_3$ calculated for the given data asset. Thereafter, for this example, the utility scoring engine 160 in conjunction with the utility scoring algorithm 164 may generate a utility score (US) for the given data asset based on the subscores and the custom weights (e.g., $w_1 U_1 + w_2 U_2 + w_3 U_3 = US$), where $w_1$ may be 0.5, $w_2$ may be 1.0, and $w_3$ may be 1.5, for example. In some implementations, a minimum number ($m_1$) of utility points may be allocated to one or more of the data assets, such as to prevent a utility score from having a 0 value ($m_1 + w_1 U_1 + w_2 U_2 + w_3 U_3 = US$), where $m_1$ may be 0.1 or another relatively small value, for example. In these manners, the utility scoring engine 160 in conjunction with the utility scoring algorithm 164 may provide, for each respective data asset of a plurality of data assets, a utility score indicative of a relative usefulness of the given data asset based on custom weights applied to values stored in specified sets of usage-based metadata fields associated with the data asset.

In some implementations, the utility score for a given data asset may be reduced according to a time decay factor (f) for metadata values contributing to the utility score for the given data asset that are older than a specified date (d), such as 6 months ago. As a non-limiting example, if a given data asset received 1,000,000 views within the previous three months (that is, less than d), the utility scoring engine 160 in conjunction with the utility scoring algorithm 164 may refrain from decaying the number of utility points allocated to the given data asset. In contrast, if the given data asset received 1,000,000 views between 6 months and 9 months ago, the utility scoring engine 160 in conjunction with the utility scoring algorithm 164 may decay the corresponding number of utility points allocated to the given data asset based on f, where f may be a value less than 1. In some instances, the time decay factor, f, may be non-linear and become increasingly small as the associated metadata values for a given data asset become increasingly older than d. For example, f may be an exponentially smaller value if the given data asset received the 1,000,000 views over 5 years ago.

The augmented scoring engine 170 may be used to predict, in conjunction with the augmented scoring algorithm 174, which of a plurality of data assets (such as in the data assets database 124) have the highest likelihood of being both relevant to and useful for a given search query. In some instances, the augmented scoring engine 170 may receive query relevancy scores generated by the relevancy scoring engine 150 in conjunction with the relevancy scoring algorithm 154 for a number of potentially relevant data assets, retrieve utility scores previously generated by the utility scoring engine 160 in conjunction with the utility scoring algorithm 164 for the number of potentially relevant data assets, and generate augmented query scores for the number of potentially relevant data assets based on the query relevancy scores and the utility scores. For example, a first data asset (Doc12) may be assigned a first query relevancy score ($QRS_1$) and a first utility score ($US_1$), and a second data asset (Doc34) may be assigned a second query relevancy score ($QRS_2$) and a second utility score ($US_2$), and the augmented scoring engine 170 in conjunction with the augmented scoring algorithm 174 may generate a first augmented query score ($AQS_1$) for the first data asset based on the first query relevancy score and the first utility score (e.g., $AQS_1=QRS_1+US_1$) and generate a second augmented query score ($AQS_2$) for the second data asset based on the second query relevancy score and the second utility score (e.g., $AQS_2=QRS_2+US_2$).

In some implementations, the augmented scoring engine 170 may apply custom weights to one or more portions of the augmented query score (AQS), such as a first custom weight ($W_1$) to the query relevancy score (QRS) portion and a second custom weight ($W_2$) to the utility score (US) portion (e.g., $AQS=W_1QRS+W_2 US$). As a non-limiting example, $W_1$ may be 0.75 and $W_2$ may be 0.25, such that the query relevancy score portion accounts for 75% of the augmented query score and the utility score portion accounts for 25% of the augmented query score. In these manners, the augmented scoring engine 170 in conjunction with the augmented scoring algorithm 174 may generate an augmented query score for a data asset based on a combination of a predicted relevancy of the data asset and a predicted usefulness of the data asset.

In some other implementations, the augmented query scores may be generated based on applying one or more mathematical functions (e.g., a logarithm) to the query relevancy score and/or the utility score (e.g., $AQS=QRS+\log(US)$). In some instances, the augmented query score may be generated based on applying a combination of custom weights and mathematical functions, e.g., $AQS=W_1QRS+W_2 \log(US)$, $AQS=W_1QRS+\log(W_2US)$, or the like. By applying a logarithm function to the utility score, the augmented scoring engine 170 in conjunction with the augmented scoring algorithm 174 may prevent an abnormally high utility score from skewing an associated augmented query score, such as if the data asset is abnormally popular and/or has an abnormally high number of views, yet is largely irrelevant to the given search query.

The ranking engine 180 may be used to generate a number of highest ranking data assets of a plurality of data assets (such as in the data assets database 124) based on the associated augmented query scores, such as from the augmented scoring engine 170. In some implementations, the ranking engine 180 may order the highest ranking data assets from a highest augmented query score to a lowest augmented query score, and generate augmented search results based on the order. In some implementations, the augmented search results may include a top z (e.g., 4) augmented scoring data assets, and the ranking engine 180 may order the top z augmented scoring data assets from highest augmented score to lowest augmented score. In some other implementations, the augmented search results may include data assets associated with augmented query scores equal to or greater than a minimum value and not include data assets associated with augmented query scores less than the minimum value. The ranking engine 180 may provide the augmented search results to the interface 110 for further processing and, upon receiving the augmented search results, the interface 110 may provide (e.g., display) the augmented search results to a user in real-time, such as while the user is entering the search query and/or immediately after the user has entered the search query.

In some implementations, the ranking system 100 may dynamically update the augmented search results as the search query is entered, such as when a character (or a specified number of characters) of the search query is entered, deleted, or changed, and the ranking engine 180 may provide the updated augmented search results to the interface 110 after each iteration or after a specified number of iterations. In some instances, the ranking engine 180 may refrain from providing updated augmented search results to the interface 110 when the updated augmented search results are the same (or in a same order) as the most recently provided augmented search results. In some other instances, the ranking engine 180 may provide the updated augmented search results to the interface 110 if the updated augmented search results include at least one data asset not included within the most recently provided augmented search results and/or when the updated augmented search results do not include at least one data asset included within most recently provided augmented search results, and otherwise, the ranking engine 180 may refrain from providing the updated augmented search results to the interface 110.

In some other implementations, the ranking system 100 may conserve processing and memory resources and/or reduce latency by generating the augmented query scores based in part on a database sharding technique. As a non-limiting example, the relevancy scoring engine 150 in conjunction with the relevancy scoring algorithm 154 may generate query relevancy scores for a first set of data assets (e.g., a first shard of 20,000 data assets among a total of 100,000 data assets), identify a top x (e.g., 500) scoring data assets within the first shard, and provide an indication of the generated scores for the top x scoring data assets to, for example, the augmented scoring engine 170. Thereafter, for this example, the augmented scoring engine 170 may retrieve the utility scores for the top x scoring data assets, and generate augmented query scores for the top x scoring data assets based on the query relevancy scores and the utility scores associated with the top x scoring data assets. The ranking system 100 may continue in this manner for an appropriate number of additional shards (e.g., 4), such as by generating query relevancy scores for a second set of data assets (e.g., a second shard of 20,000 data assets among the total of 100,000 data assets), identify a top x scoring data assets within the second shard, and so on. In this manner, the ranking system 100 may conserve processing and memory resources and/or reduce latency by retrieving utility scores and generating augmented query scores for only a most relevant portion (e.g., 2.5%) of the total number of data assets. It is to be understood that the relevant portion could be any other appropriate value.

The splitting engine 140, the relevancy scoring engine 150, the utility scoring engine 160, the augmented scoring engine 170, and the ranking engine 180 may be implemented in software, hardware, or a combination thereof. In some implementations, any one or more of the splitting engine 140, the relevancy scoring engine 150, the utility scoring engine 160, the augmented scoring engine 170, or the ranking engine 180 may be embodied in instructions that, when executed by the processor 130, cause the ranking system 100 to perform operations. The instructions of one or more of the components 140-180—including one or more of the relevancy scoring algorithm 154, the utility scoring algorithm 164, or the augmented scoring algorithm 174—may be stored in the memory 135, the database 120, or a different suitable memory. The instructions may be in any suitable programming language format for execution by the ranking system 100 (such as by the processor 130). It is to be understood that the particular architecture of the ranking system 100 shown in FIG. 1 is but one example of a variety of different architectures within which aspects of the present disclosure may be implemented. For example, in some other implementations, components of the ranking system 100 may be distributed across multiple devices, included in fewer components, and so on. While the below examples of generating augmented search results are described with reference to the ranking system 100, any suitable system may be used.

Figure 2:
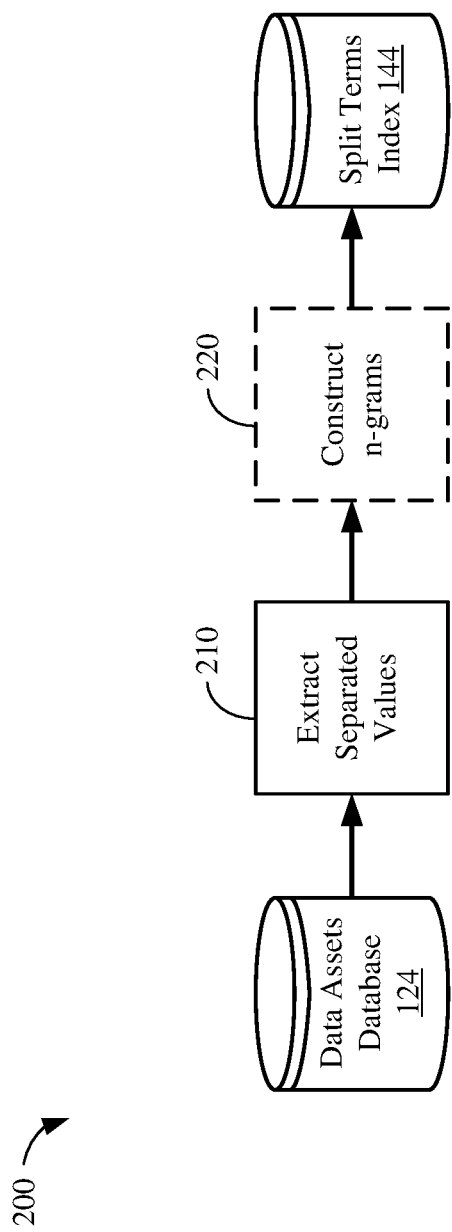
FIG. 2 shows a high-level overview of an example process flow that may be employed by the ranking system of FIG. 1, according to some implementations.

FIG. 2 shows a high-level overview of an example process flow 200 that may be employed by the ranking system 100 of FIG. 1, according to some implementations, during which the splitting engine 140 in conjunction with the data assets database 124 generates the split terms index 144.

Prior to block 210, the ranking system 100 may generate a data assets database (such as the data assets database 124) including a plurality of data assets, where each respective data asset of the plurality of data assets includes metadata fields storing values indicative of characteristics of the respective data asset.

At block 210, the splitting engine 140 may extract separated values from the metadata fields based on at least one delimiter within the values included in the metadata fields.

At block 220, the splitting engine 140 may construct a set of n-grams from ones of the separated values. In some implementations, the ones of the separated values may be associated with at least a first metadata field, such as a field that stores values indicative of a filename of a respective data asset or a qualified name of the respective data asset. In some other implementations, the splitting engine 140 may refrain from constructing the set of n-grams, such as if the ranking system 100 is not configured to perform a partial term analysis for search queries.

After block 220, the splitting engine 140 may generate a split terms index (such as the split terms index 144) including the separated values and the set of n-grams. In some implementations, the splitting engine 140 may provide (access to) the split terms index 144 for at least one of the relevancy scoring engine 150, the utility scoring engine 160, the augmented scoring engine 170, or the ranking engine 180, such as for generating augmented search results.

Figure 3:
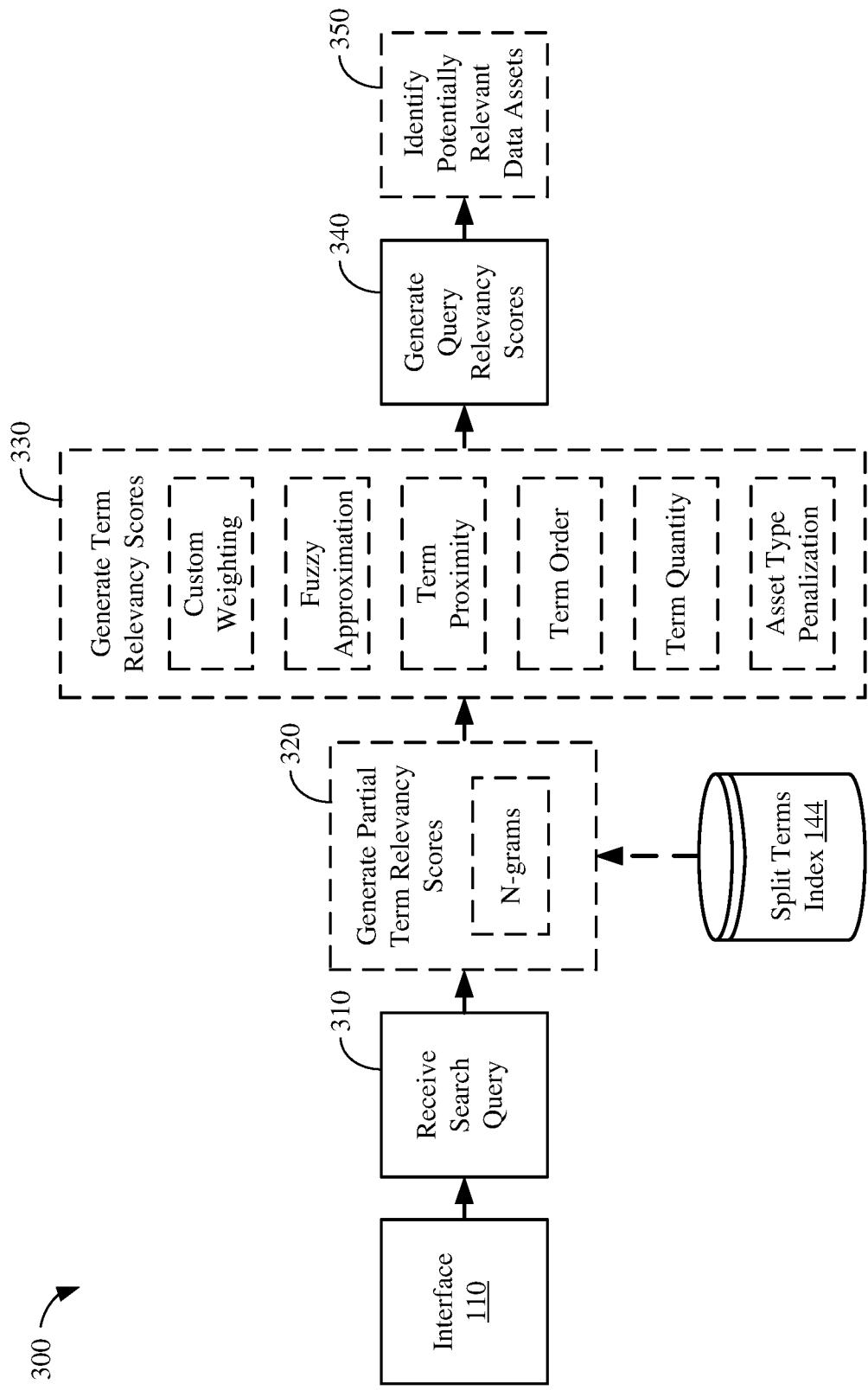
FIG. 3 shows a high-level overview of an example process flow that may be employed by the ranking system of FIG. 1, according to some implementations.

FIG. 3 shows a high-level overview of an example process flow 300 that may be employed by the ranking system 100 of FIG. 1, according to some implementations, during which the relevancy scoring engine 150 in conjunction with the relevancy scoring algorithm 154 predicts which of a plurality of data assets have the highest likelihood of being relevant to a given search query.

Prior to block 310, the ranking system 100 may monitor keystroke and/or clickstream data for a search query, such as a search query submitted via the interface 110 or a search query being entered via the interface 110 in real-time. In some implementations, the ranking system 100 may refrain from monitoring for search queries and instead receive the search query from a different appropriate system in conjunction with an appropriate interface.

At block 310, the relevancy scoring engine 150 may receive at least a portion of the search query from the interface 110, the splitting engine 140, or the different appropriate system described above. In some implementations, the at least portion of the search query may include one or more search terms. If the one or more search terms do not include a partial search term, the ranking system 100 may proceed to block 330 from block 310.

At block 320, the relevancy scoring engine 150 in conjunction with the relevancy scoring algorithm 154 may generate, for each respective data asset of the plurality of data assets, a partial term relevancy score for the partial search term. In some implementations, the partial term relevancy score may be generated based on one or more separated values (e.g., the separated values described in connection with block 210 of FIG. 2) and a set of n-grams (e.g., the n-grams described in connection with block 220 of FIG. 2), such as from the split terms index 144. In some aspects, the partial term relevancy score may indicate a likelihood that the respective data asset is relevant to the partial search term. If there are no remaining terms before-or-after the partial search term, the ranking system 100 may proceed to block 340 from block 320.

At block 330, the relevancy scoring engine 150 in conjunction with the relevancy scoring algorithm 154 may generate, for each respective data asset of the plurality of data assets, a term relevancy score for each respective remaining term of the search query. In some implementations, the term relevancy score may be generated based on one or more separated values (e.g., the separated values described in connection with block 210 of FIG. 2). The term relevancy scores may be generated based on a combination of matching techniques, such as at least one of a custom weighting technique, a fuzzy approximation technique, a term proximity technique, a term order technique, a term quantity technique, or an asset type penalization technique. In some aspects, a term relevancy score for a given data asset may indicate a likelihood that the given data asset is relevant to the respective remaining term.

At block 340, the relevancy scoring engine 150 in conjunction with the relevancy scoring algorithm 154 may generate, for each respective data asset of the plurality of data assets, a query relevancy score indicating a likelihood that the respective data asset is relevant to the search query. In some instances, the query relevancy score may be generated based on at least one of a partial term relevancy score generated for the respective data asset (as described in connection with block 320) or one or more term relevancy scores generated for the respective data asset (as described in connection with block 330). In some aspects, the relevancy scoring engine 150 may refrain from generating query relevancy scores for one or more data assets previously filtered from the plurality of data assets, such as data assets associated with a particular tag or label indicating that the data asset is to be excluded from relevancy scoring.

At block 350, the relevancy scoring engine 150 may identify a number of potentially relevant data assets among the plurality of data assets based on the query relevancy scores. In some implementations, the relevancy scoring engine 150 may provide an indication of the number of potentially relevant data assets to at least one of the augmented scoring engine 170, the ranking engine 180, or the interface 110. In some instances, the relevancy scoring engine 150 may refrain from identifying the number of potentially relevant data assets and instead directly provide the query relevancy scores to another appropriate component for further processing.

Figure 4:
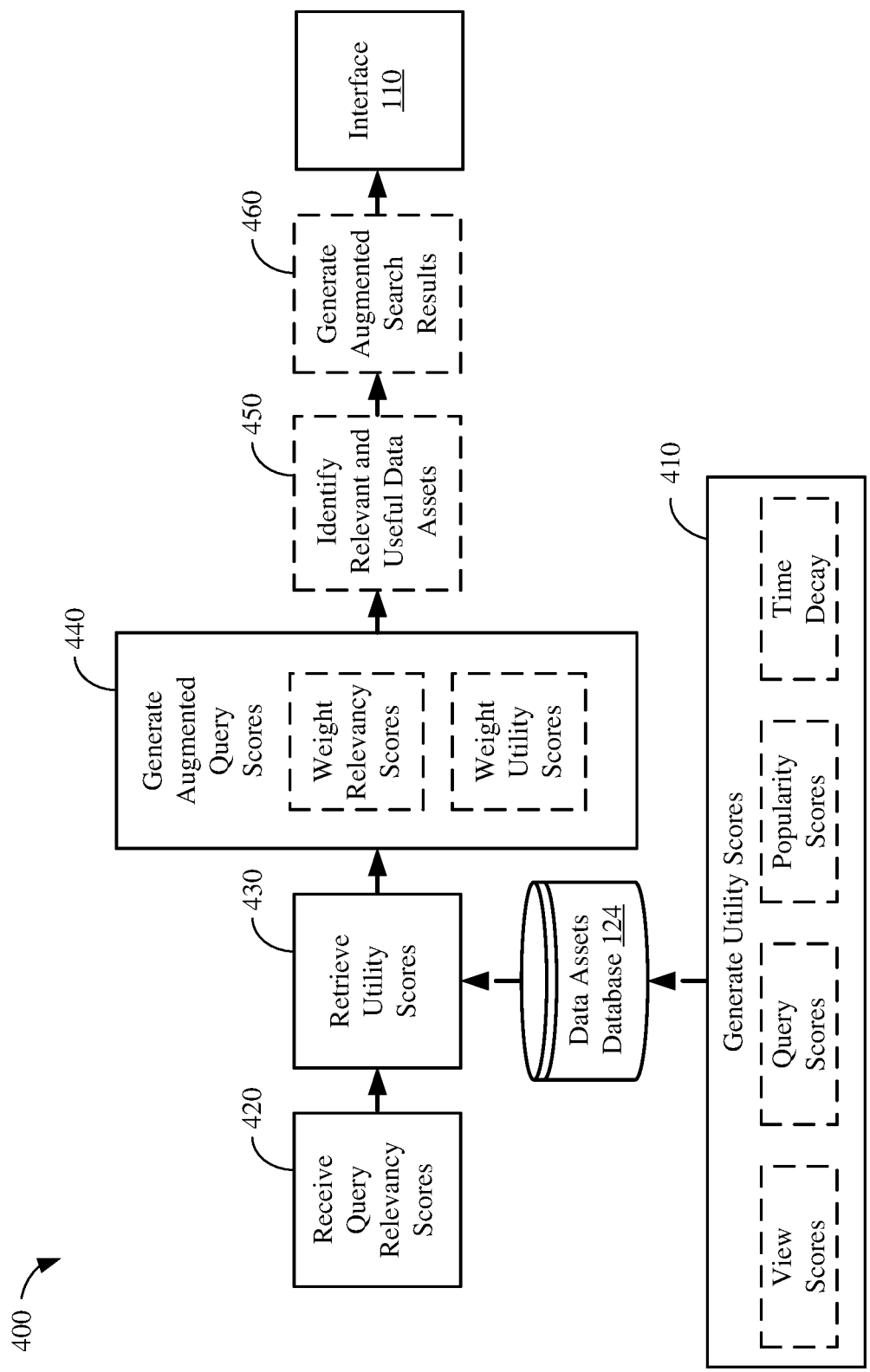
FIG. 4 shows a high-level overview of an example process flow that may be employed by the ranking system of FIG. 1, according to some implementations.

FIG. 4 shows a high-level overview of an example process flow 400 that may be employed by the ranking system 100 of FIG. 1, according to some implementations, during which the augmented scoring engine 170 in conjunction with the augmented scoring algorithm 174 predicts which of a plurality of data assets have the highest likelihood of being both relevant to and useful for a given search query, and the ranking engine 180 generates and provides augmented search results for the given search query to the interface 110.

At block 410, the utility scoring engine 160 in conjunction with the utility scoring algorithm 164 may generate, for each respective data asset of the plurality of data assets, a utility score indicating a likelihood that the respective data asset is useful according to a utility scoring algorithm. As described in connection with FIG. 1, the utility score may be generated based on a view score generated for the given data asset, a query score generated for the given data asset, a popularity score generated for the given data asset, and/or a time decay factor applied to one or more of the metadata values associated with the given data asset. In some implementations, the generated utility scores may be stored in the data assets database 124.

At block 420, the augmented scoring engine 170 may receive query relevancy scores associated with, for example, a number of data assets among the plurality of data assets identified as potentially relevant to the given search query, such as the query relevancy scores and the potentially relevant data assets described in connection with blocks 340 and 350 of FIG. 3, respectively.

At block 430, the augmented scoring engine 170 may retrieve, for each of the number of potentially relevant data assets, the utility score associated with the respective relevant data asset. For example, the augmented scoring engine 170 may retrieve the utility scores from the data assets database 124.

At block 440, the augmented scoring engine 170 in conjunction with the augmented scoring algorithm 174 may generate, for each respective data asset of the number of potentially relevant data assets, an augmented query score indicating a likelihood that the respective data asset is relevant to and useful for the given search query based on the query relevancy scores and the utility scores. In some instances, the augmented query scores may be generated further based on a first custom weight applied to the query relevancy scores and a second custom weight applied to the utility scores. As a non-limiting example, the augmented scoring engine 170 in conjunction with the augmented scoring algorithm 174 may apply, for each respective data asset of the number of potentially relevant data assets, a first custom weight (e.g., 0.75) to the query relevancy score generated for the respective data asset, and a second custom weight (e.g., 0.25) to the utility score generated for the respective data asset. In some aspects, the first and second custom weights may be other suitable values. In some instances, the first custom weight may be 1.00 or the augmented scoring engine 170 may otherwise refrain from applying a custom weight to the query relevancy scores and/or the second custom weight may be 1.00 or the augmented scoring engine 170 may otherwise refrain from applying a custom weight to the utility scores.

At block 450, the augmented scoring engine 170 may identify a number of relevant and useful data assets among the plurality of data assets based on the augmented query scores. In some implementations, the augmented scoring engine 170 may provide an indication of the number of relevant and useful data assets to the ranking engine 180. In some instances, the augmented scoring engine 170 may refrain from identifying the number of relevant and useful data assets and instead directly provide the augmented query scores to another appropriate component, such as the ranking engine 180, for further processing.

At block 460, the ranking engine 180 may identify, among the number of relevant and useful data assets, a top n (e.g., 8) data assets having the highest augmented query scores, and generate augmented search results including the top n data assets. In some implementations, the ranking engine 180 may order (or "rank") the top n scoring data assets from highest augmented query score to lowest augmented query score. In some other implementations, the order may be from lowest-to-highest, from a most recent to a least recent edit time, or any other appropriate ordering pattern. In some instances, the augmented search results may exclude data assets having an augmented query score lower than a specified value or an augmented query score outside of an acceptable range. In some other instances, the ranking engine 180 may display the ordered data assets on the interface 110, such as in real-time with the system user entering the given search query and/or immediately after the system user enters the given search query. In some other implementations, the ranking engine 180 may provide an indication of the augmented search results to one or more other appropriate components for further processing and/or display.

Figure 5:
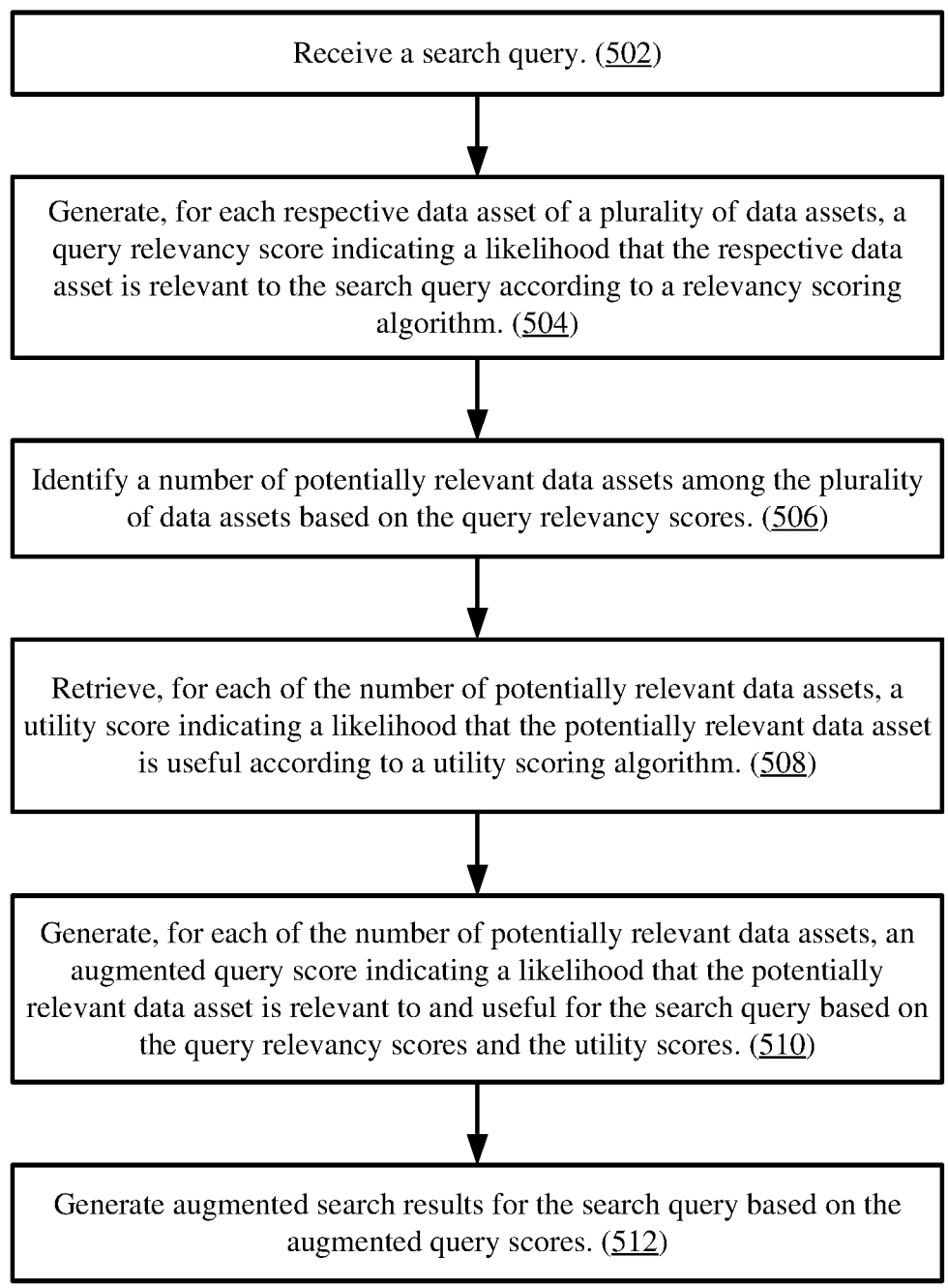
FIG. 5 shows an illustrative flowchart depicting an example operation for generating augmented search results, according to some implementations.

FIG. 5 shows an illustrative flowchart depicting an example operation 500 for generating augmented search results, according to some implementations. The example operation 500 may be performed by one or more processors of a computing device in conjunction with an electronic ranking system. In some implementations, the example operation 500 may be performed using the ranking system 100 of FIG. 1. It is to be understood that the example operation 500 may be performed by any suitable systems, computers, or servers.

At block 502, the ranking system 100 receives a search query. At block 504, the ranking system 100 generates, for each respective data asset of a plurality of data assets, a query relevancy score indicating a likelihood that the respective data asset is relevant to the search query according to a relevancy scoring algorithm. At block 506, the ranking system 100 identifies a number of potentially relevant data assets among the plurality of data assets based on the query relevancy scores. At block 508, the ranking system 100 retrieves, for each of the number of potentially relevant data assets, a utility score indicating a likelihood that the potentially relevant data asset is useful according to a utility scoring algorithm. At block 510, the ranking system 100 generates, for each of the number of potentially relevant data assets, an augmented query score indicating a likelihood that the potentially relevant data asset is relevant to and useful for the search query based on the query relevancy scores and the utility scores. At block 512, the ranking system 100 generates augmented search results for the search query based on the augmented query scores.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for generating augmented search results, the method performed by one or more processors of a ranking system and comprising:

receiving a search query comprising one or more search terms including at least a partial search term;

generating, for each data asset of a plurality of data assets, a query relevancy score indicating a likelihood that the respective data asset is relevant to the search query according to a relevancy scoring algorithm, the query relevancy score generated by:

generating a partial term relevancy score for the partial search term based on separated values included in a split terms index, the partial term relevancy score indicating a likelihood that the respective data asset is relevant to the partial search term;

generating a term relevancy score for each respective remaining term from the search query based on the separated values included in the split terms index, the term relevancy score indicating a likelihood that the respective data asset is relevant to the respective remaining term; and generating the query relevancy score for the respective data asset based on the partial term relevancy score generated for the respective data asset and the term relevancy scores generated for the respective data asset;

identifying a number of potentially relevant data assets among the plurality of data assets based on the query relevancy scores;

retrieving, for each of the number of potentially relevant data assets, a utility score indicating a likelihood that the potentially relevant data asset is useful according to a utility scoring algorithm;

generating, for each of the number of potentially relevant data assets, an augmented query score indicating a likelihood that the potentially relevant data asset is relevant to and useful for the search query based on the query relevancy scores and the utility scores; and generating augmented search results for the search query based on the augmented query scores.

2. The method of claim 1, wherein each respective data asset of the plurality of data assets includes metadata fields that store values indicative of characteristics of the respective data asset, the method further comprising:

generating a data assets database including the plurality of data assets;

extracting the separated values from the metadata fields based on delimiters included within the values stored in the metadata fields;

constructing a set of n-grams from ones of the separated values associated with at least a first metadata field of the metadata fields, wherein the first metadata field stores values indicative of at least one of a filename of the respective data asset or a qualified name of the respective data asset; and generating the split terms index including the separated values and the set of n-grams, wherein generating the query relevancy score is based at least in part on the split terms index.

3. The method of claim 1, wherein the relevancy scoring algorithm predicts a relevancy of the respective data asset to the search query based on a combination of matching techniques, wherein the combination of matching techniques includes at least one of a custom weighting technique, a fuzzy approximation technique, a term proximity technique, a term order technique, a term quantity technique, an n-gram technique, or an asset type penalization technique.

4. The method of claim 3, wherein the custom weighting technique assigns relatively higher custom weights to values extracted from a first set of metadata fields deemed to have relatively more significance to predicting the relevancy of the respective data asset and assigns relatively lower custom weights to values extracted from a second set of metadata fields deemed to have relatively less significance to predicting the relevancy of the respective data asset.

5. The method of claim 1, wherein the utility scoring algorithm generates the utility scores for each respective data asset based on custom weights applied to values stored in usage-based metadata fields associated with the respective data asset.

6. The method of claim 5, wherein the values stored in the usage-based metadata fields are indicative of at least one of a popularity of the respective data asset, a usage of the respective data asset, a number of aggregate reads of the respective data asset, a number of aggregate writes to the respective data asset, a most recent refresh time for the respective data asset, a quality of the respective data asset, a view count for the respective data asset, or a number of queries executed on the respective data asset.

7. The method of claim 1, wherein generating the augmented query score is based on an augmented scoring algorithm including a first custom weight applied to the query relevancy score and a second custom weight applied to the utility score, wherein the first custom weight is different than the second custom weight.

8. The method of claim 1, further comprising:

receiving the search query from a user;

identifying a number of highest ranking data assets based on the augmented query scores;

ordering the number of highest ranking data assets from highest augmented query score to lowest augmented query score, wherein generating the augmented search results is based on the ordering; and providing the augmented search results to the user in real-time.

9. A system comprising:

one or more processors; and at least one memory coupled to the one or more processors and storing instructions that, when executed by the one or more processors, cause the system to perform operations including:

receiving a search query comprising one or more search terms including at least a partial search term;

generating, for each data asset of a plurality of data assets, a query relevancy score indicating a likelihood that the respective data asset is relevant to the search query according to a relevancy scoring algorithm, the query relevancy score generated by:

generating a partial term relevancy score for the partial search term based on separated values included in a split terms index, the partial term relevancy score indicating a likelihood that the respective data asset is relevant to the partial search term;

generating a term relevancy score for each respective remaining term from the search query based on the separated values included in the split terms index, the term relevancy score indicating a likelihood that the respective data asset is relevant to the respective remaining term; and generating the query relevancy score for the respective data asset based on the partial term relevancy score generated for the respective data asset and the term relevancy scores generated for the respective data asset;

identifying a number of potentially relevant data assets among the plurality of data assets based on the query relevancy scores;

retrieving, for each of the number of potentially relevant data assets, a utility score indicating a likelihood that the potentially relevant data asset is useful according to a utility scoring algorithm;

generating, for each of the number of potentially relevant data assets, an augmented query score indicating a likelihood that the potentially relevant data asset is relevant to and useful for the search query based on the query relevancy scores and the utility scores; and generating augmented search results for the search query based on the augmented query scores.

10. The system of claim 9, wherein each respective data asset of the plurality of data assets includes metadata fields that store values indicative of characteristics of the respective data asset, and wherein execution of the instructions causes the system to perform operations further including:

generating a data assets database including the plurality of data assets;

extracting the separated values from the metadata fields based on delimiters included within the values stored in the metadata fields;

constructing a set of n-grams from ones of the separated values associated with at least a first metadata field of the metadata fields, wherein the first metadata field stores values indicative of at least one of a filename of the respective data asset or a qualified name of the respective data asset; and generating the split terms index including the separated values and the set of n-grams, wherein generating the query relevancy score is based at least in part on the split terms index.

11. The system of claim 9, wherein the relevancy scoring algorithm predicts a relevancy of the respective data asset to the search query based on a combination of matching techniques, wherein the combination of matching techniques includes at least one of a custom weighting technique, a fuzzy approximation technique, a term proximity technique, a term order technique, a term quantity technique, an n-gram technique, or an asset type penalization technique.

12. The system of claim 11, wherein the custom weighting technique assigns relatively higher custom weights to values extracted from a first set of metadata fields deemed to have relatively more significance to predicting the relevancy of the respective data asset and assigns relatively lower custom weights to values extracted from a second set of metadata fields deemed to have relatively less significance to predicting the relevancy of the respective data asset.

13. The system of claim 9, wherein the utility scoring algorithm generates the utility scores for each respective data asset based on custom weights applied to values stored in usage-based metadata fields associated with the respective data asset.

14. The system of claim 13, wherein the values stored in the usage-based metadata fields are indicative of at least one of a popularity of the respective data asset, a usage of the respective data asset, a number of aggregate reads of the respective data asset, a number of aggregate writes to the respective data asset, a most recent refresh time for the respective data asset, a quality of the respective data asset, a view count for the respective data asset, or a number of queries executed on the respective data asset.

15. The system of claim 9, wherein generating the augmented query score is based on an augmented scoring algorithm including a first custom weight applied to the query relevancy score and a second custom weight applied to the utility score, wherein the first custom weight is different than the second custom weight.

16. The system of claim 9, wherein execution of the instructions causes the system to perform operations further including:
receiving the search query from a user;
identifying a number of highest ranking data assets based on the augmented query scores;
ordering the number of highest ranking data assets from highest augmented query score to lowest augmented query score, wherein generating the augmented search results is based on the ordering; and
providing the augmented search results to the user in real-time.

17. A non-transitory computer-readable medium storing instructions that, when executed by one or more processors of a system, cause the system to perform operations including:
receiving a search query comprising one or more search terms including at least a partial search term;
generating, for each data asset of a plurality of data assets, a query relevancy score indicating a likelihood that the respective data asset is relevant to the search query according to a relevancy scoring algorithm, the query relevancy score generated by:
generating a partial term relevancy score for the partial search term based on separated values included in a split terms index, the partial term relevancy score indicating a likelihood that the respective data asset is relevant to the partial search term;
generating a term relevancy score for each respective remaining term from the search query based on the separated values included in the split terms index, the term relevancy score indicating a likelihood that the respective data asset is relevant to the respective remaining term; and
generating the query relevancy score for the respective data asset based on the partial term relevancy score generated for the respective data asset and the term relevancy scores generated for the respective data asset;
identifying a number of potentially relevant data assets among the plurality of data assets based on the query relevancy scores;
retrieving, for each of the number of potentially relevant data assets, a utility score indicating a likelihood that the potentially relevant data asset is useful according to a utility scoring algorithm;
generating, for each of the number of potentially relevant data assets, an augmented query score indicating a likelihood that the potentially relevant data asset is relevant to and useful for the search query based on the query relevancy scores and the utility scores; and
generating augmented search results for the search query based on the augmented query scores.

18. The computer-readable medium of claim 17, wherein each respective data asset of the plurality of data assets includes metadata fields that store values indicative of characteristics of the respective data asset, and wherein execution of the instructions causes the system to perform operations further including:
generating a data assets database including the plurality of data assets;
extracting the separated values from the metadata fields based on delimiters included within the values stored in the metadata fields;
constructing a set of n-grams from ones of the separated values associated with at least a first metadata field of the metadata fields, wherein the first metadata field stores values indicative of at least one of a filename of the respective data asset or a qualified name of the respective data asset; and
generating the split terms index including the separated values and the set of n-grams, wherein generating the query relevancy score is based at least in part on the split terms index.

* * * * *